May 21, 1935. G. J. SHAFER 2,002,416
TRAILER HITCH
Filed Oct. 11, 1934 2 Sheets-Sheet 1
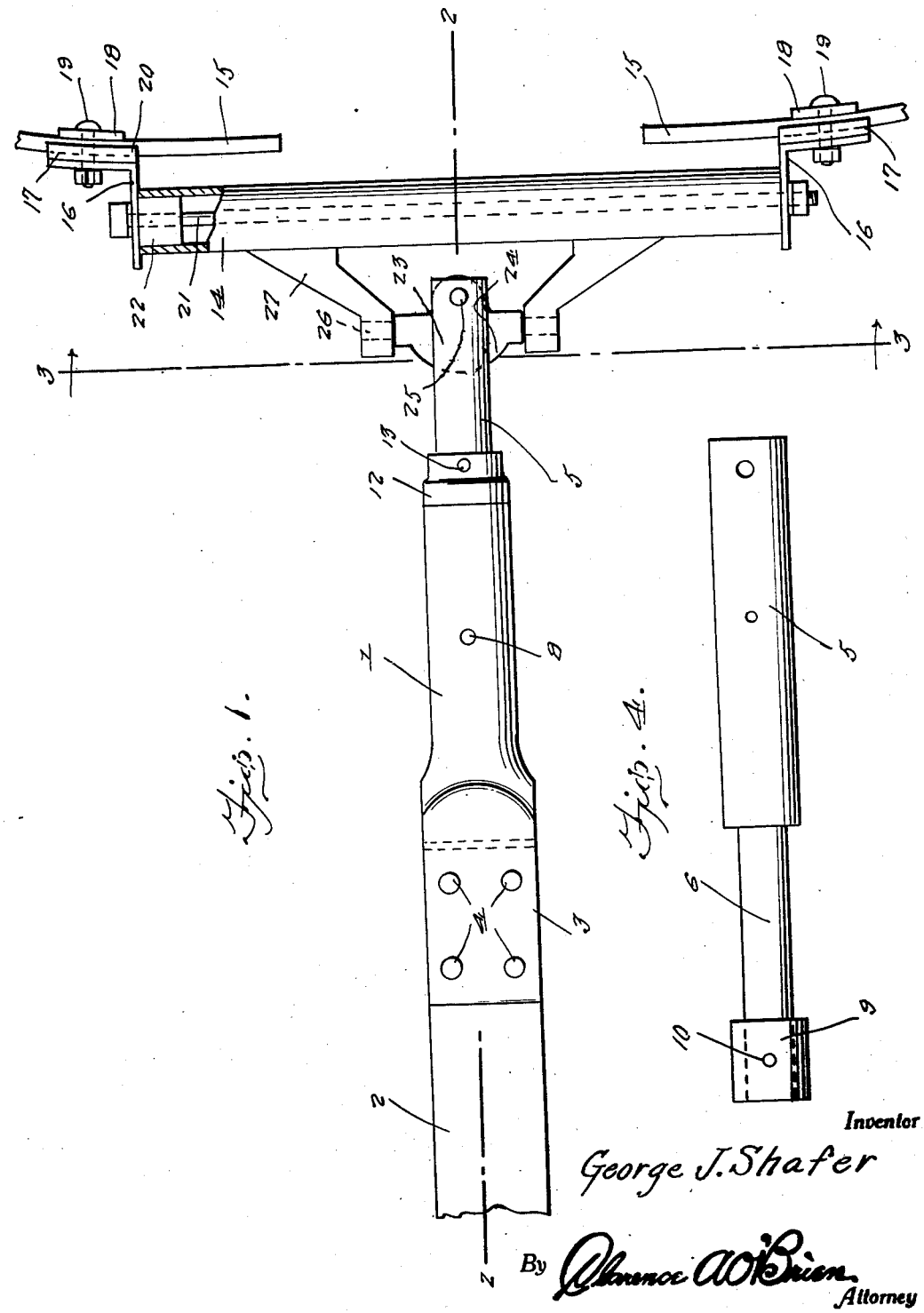
Inventor
George J. Shafer
By Clarence A. O'Brien
Attorney May 21, 1935.　　　　　G. J. SHAFER　　　　　2,002,416
TRAILER HITCH
Filed Oct. 11, 1934　　2 Sheets-Sheet 2
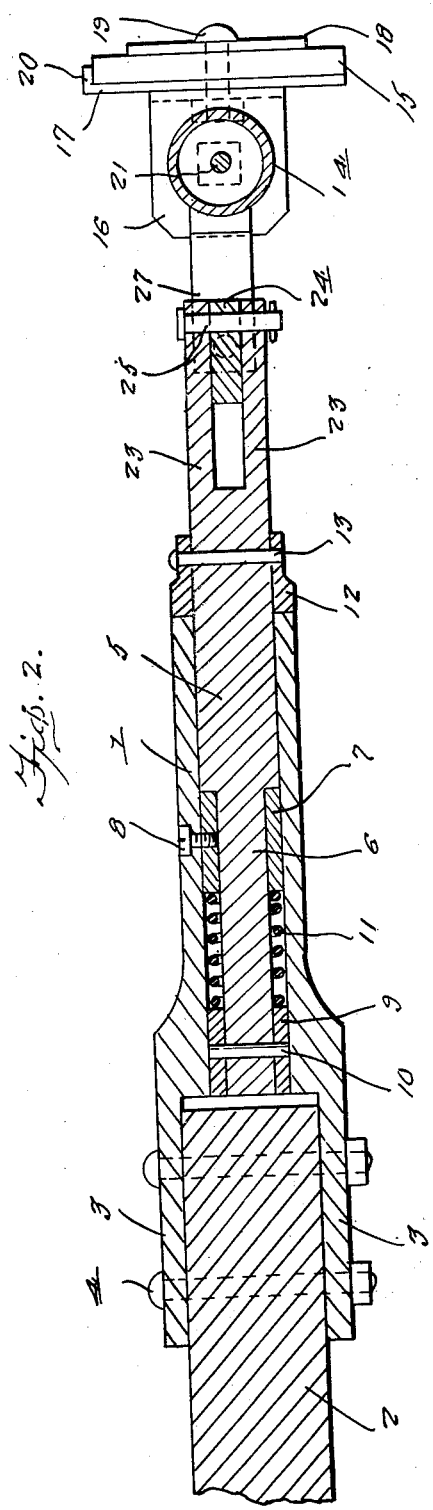
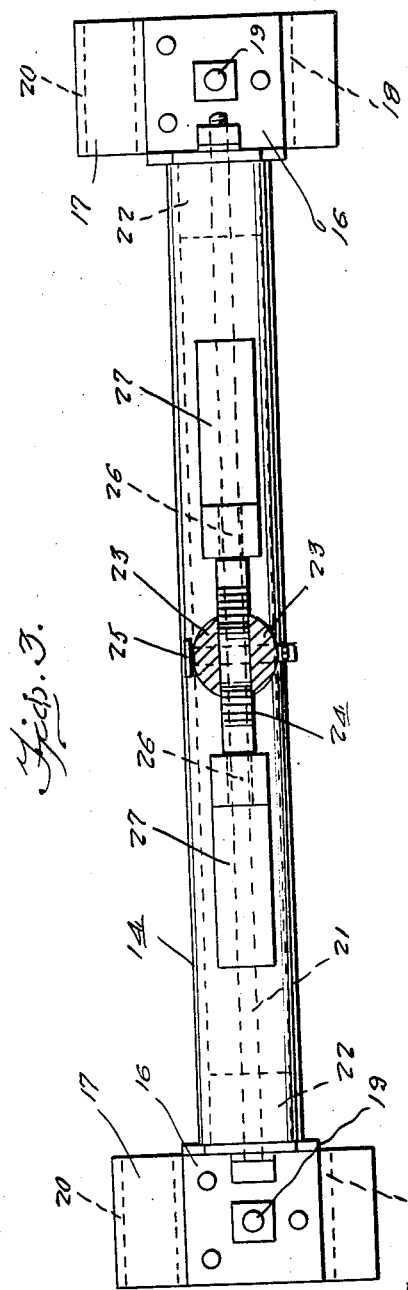
Inventor
George J. Shafer
By Clarence A. O'Brien
Attorney Patented May 21, 1935

2,002,416

UNITED STATES PATENT OFFICE 2,002,416

TRAILER HITCH

George Jacob Shafer, Jacksonville, Oreg., assignor of one-third to Barney Cody, Jacksonville, Oreg.

Application October 11, 1934, Serial No. 747,935

1 Claim. (Cl. 280—33.44)

The present invention relates to new and useful improvements in trailer hitches and has for one of its important objects to provide, in a manner as hereinafter set forth, a trailer hitch comprising a novel construction, combination and arrangement of parts through the medium of which the transmission of shock between the towing vehicle, such as an automobile, and the trailer will be prevented.

Another important object of the invention is to provide a trailer hitch of the aforementioned character which is capable of substantially universal swinging movement for compensating for irregularities in the highway and for permitting turns to be made without difficulty.

Still another important object of the invention is to provide a trailer hitch of the character described which includes novel means for attachment to the rear bumpers of an automobile.

Other objects of the invention are to provide a trailer hitch which will be comparatively simple in construction, strong, durable, compact, rattle-proof and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in top plan of a trailer hitch constructed in accordance with the present invention, a portion thereof being broken away in section.

Figure 2 is a view in vertical longitudinal section, taken substantially on the line 2—2 of Figure 1.

Figure 3 is a view in vertical transverse section, taken substantially on the line 3—3 of Figure 1.

Figure 4 is a detail view of the draw bar.

Referring now to the drawings in detail, it will be seen that the embodiment of the present invention which has been illustrated comprises a metallic sleeve 1 which is mounted on the forward end of the trailer tongue 2 in a manner to project forwardly therefrom. The sleeve 1 includes comparatively wide, flat integral bifurcations 3 on its rear end which receive the tongue 2 therebetween where said tongue is anchored through the medium of nut equipped bolts 4.

Mounted for reciprocation in the sleeve 1 is a draw bar 5 which, it will be noted, projects forwardly from said sleeve. As illustrated to advantage in Figure 2 of the drawings, the draw bar 5 includes a reduced rear end portion 6 which extends slidably through a bushing 7 which is secured in an intermediate portion of the sleeve 1 by a screw 8. Secured on the rear end portion of the reduced portion 6 of the draw bar 5 and slidable in the sleeve 1 is a bushing 9 which is retained on said draw bar by a pin 10. A coil spring 11 encircles the reduced portion 6 of the draw bar 5 between the bushings 7 and 9 in a manner to yieldingly resist forward sliding movement of said draw bar. A stop collar 12 is secured on the forward portion of the draw bar 5 by a pin 13 for limiting rearward sliding movement of said draw bar, said stop collar being engageable with the forward end of the sleeve 1.

The reference numeral 14 designates a tubular shaft which is firmly secured on the rear bumpers 15 of an automobile by means including angular brackets 16. The brackets 16 include coacting plates 17 and 18 which are clamped on opposite sides of the bumpers 15 by nut equipped bolts 19. As best seen in Figure 2 of the drawings, the plates 17 terminate in horizontal flanges 20 at their upper ends which engage the upper edges of the bumpers. The tubular shaft 14 is secured between the rearwardly projecting portions of the brackets 16 by a bolt 21. The bolt 21 passes through centering plugs 22 which are mounted in the end portions of the tubular shaft 14.

At its forward end, the draw bar 5 terminates in bifurcations 23 between which a cross head 24 is mounted for swinging movement in a horizontal plane about a pin 25. At its ends, the cross head 24 is provided with trunnions 26 which are journaled in arms 27 on the tubular shaft 14.

From a consideration of the foregoing it is thought that the operation of the trailer hitch will be obvious. The spring 11 absorbs shocks between the automobile and the trailer, as when starting, thus preventing damage to said automobile or trailer. The pivotal mounting of the cross head 24 on the draw bar 5 permits the automobile to make right or left turns, while the rotary mounting of said cross head between the arms 27 compensate for irregularities in the road or, in other words, permits relative vertical movement between the automobile and the trailer.

It is believed that the many advantages of a trailer hitch constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

A hitch for trailer drawbars comprising spaced, opposed brackets mounted on the rear bumpers of an automobile, said brackets including plates clamped to the opposite sides of the bumpers, horizontal flanges on the upper end of one of the plates of each pair engaged with the upper edges of the bumpers, a tubular shaft mounted between the brackets, a bolt extending through the shaft and anchored in the brackets, centering plugs encircling the bolt in the end portions of the tubular shaft, arms projecting from the tubular shaft, and a cross head journalled between said arms and adapted to be pivotally connected to a draw bar.

GEORGE JACOB SHAFER.